United States Patent Office 3,499,344
Patented Mar. 10, 1970

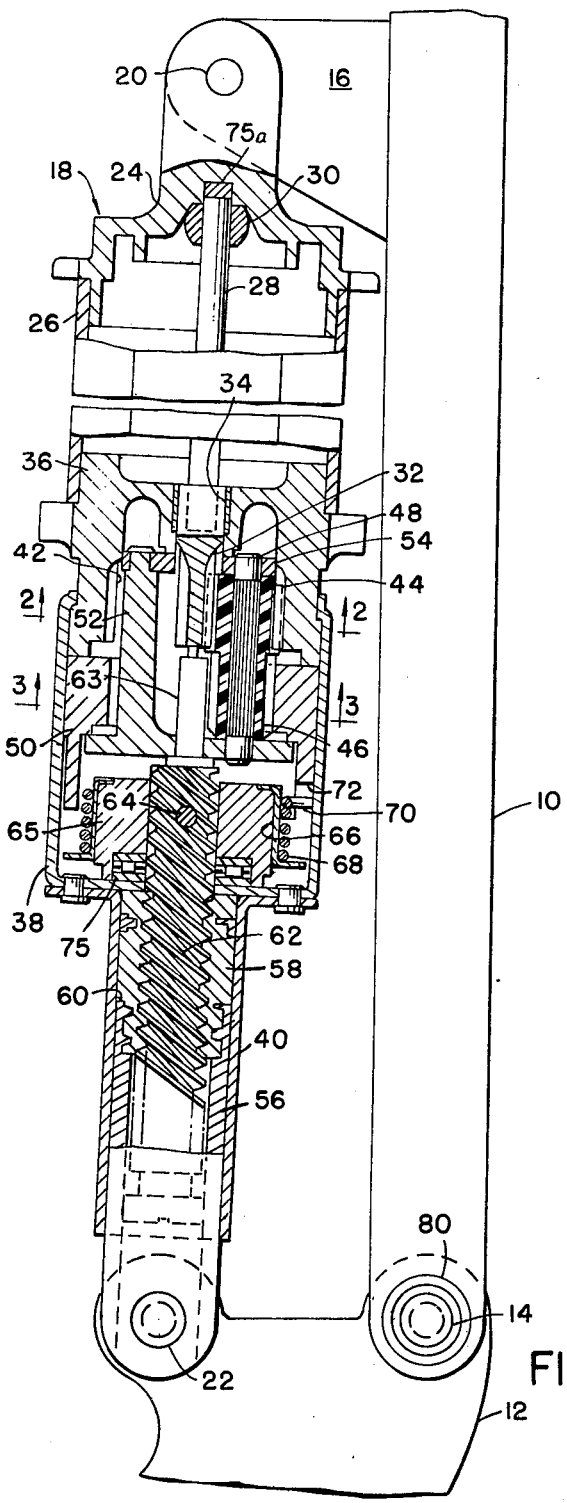

3,499,344
POWER RECLINER ASSEMBLY
Joseph Pickles, Bloomfield Hills, Mich., assignor to Ferro Manufacturing Corporation, Detroit, Mich., a corporation of Michigan
Filed May 13, 1968, Ser. No. 728,717
Int. Cl. F16h 1/10
U.S. Cl. 74—424.8                          5 Claims

ABSTRACT OF THE DISCLOSURE

A power unit connected between the seat and back frame of a seat, the assembly including a motor and planetary gearing connecting to a nut and screw device for effecting movement of the seat between erect and reclining position. The drive includes a one-way drive connection which permits movement of the seat from reclining to erect position by direct application of force to the seat.

FIELD OF THE INVENTION

The invention relates to reclining seats of the type in use on vehicles such as airplanes, buses, automobiles and the like. In general, seats of this type have seat backs which can be released and moved rearwardly by pressure applied by the occupant, after which the release is disabled so that the seat back stays in adjusted position. Normally, resilient means such as springs are applied to the seat back tending to move it to upright or erect position and this resilient means has sufficient power to move the seat back upwardly only when the release is operated. In many cases however, it is desirable to be able to move the seat back upwardly even though the release is not operated. This occurs for exampe in airplanes when the occupant of one seat departs and leaves the seat back in reclining position.

SUMMARY OF THE INVENTION

In the present invention a power unit comprising a motor is connected as an extensible link intermediate the seat frame and seat back so that upon change in length thereof, the seat back is swung forwardly or rearwardly about a hinge or pivot adjacent its lower edge. The drive is from a motor incorporated into the unit, driving through epicyclic gearing to a rotatable nut held against rotation and movable longitudinally on a rotatable screw. The power transmission train is irreversible so that the seat back remains in whatever position it occupies when the motor is de-energized. However, in the power transmission train there is a frictional drive element which can be caused to slip as a consequence of force applied directly to the seat back to raise the seat back.

It is accordingly an object of the present invention to provide self-contained power operable extensible linkage adapted to be connected between a seat frame and a seat back in which extension of the linkage is accomplished by relative movement between a screw and nut accomplished through a gear train, the gear train being irreversible so as to prevent reverse drive from the seat back to the motor as a result of force applied directly to the seat back.

It is a further object of the present invention to provide linkage as described in the preceding paragraph in which the power transmission intermediate the motor and the screw and nut device includes a friction drive and preferably a one-way friction drive which prevents rearward movement of the seat back as a result of the application of force directly to the seat back but which permits forward movement of the seat back while the motor is de-energized as a consequence of force applied directly to the seat back.

Other objects and features of the invention will become apparent as the description proceeds, especially when taken in conjunction with the accompanying drawing, illustrating a preferred embodiment of the invention.

BRIEF DESCRIPTION OF THE DRAWING

FIGURE 1 is a side elevational view, partly in section, of the extensible link shown connected between the seat frame and seat back.

FIGURE 2 is an enlarged section on the line 2—2, FIGURE 1.

FIGURE 3 is an enlarged section on the line 3—3, FIGURE 1.

DESCRIPTION OF THE PREFERRED EMBODIMENT

In the drawing a portion 10 of the seat back is pivoted to the seat frame 12 as indicated at 14. The seat back 10 includes a bracket 16 to which the upper end of the extensible link, indicated generally at 18, is pivoted as indicated at 20. The lower end of the link 18 is pivoted as indicated at 22 to the seat frame 12 at a point spaced forwardly from the pivot connection between the seat back 10 and the seat frame 12. As a result of the geometry of the parts so far described it will be apparent that extension of the link will cause the seat back 10 to swing rearwardly about the axis of pivot connection 14 to a reclining position. In the particular embodiment shown, rearward movement of the seat back is limited, as for example to approximately 45 degrees from the vertical. However, it will be appreciated that if movement of the seat back to full reclining or horizontal position were desired, this would simply require repositioning of the pivot mountings 14 and 22.

Received within a housing formed by an end cap 24 and a tubular housing 26 is an electric motor, details of which are not shown. The motor however includes an armature rotatable with a shaft 28 one end of which is received in an annular bearing 30 provided in the cap 24. The opposite end of the shaft 28 is fixedly connected to an elongated sun gear 32 which is journaled for rotation in an opening 34 in a ring gear housing 36 which constitutes the opposite end closure for the motor housing. The ring gear housing 36 carries a cylindrical housing 38 which in turn carries an elongated tubular tower 40 for purposes which will presently be described.

The ring gear housing 36 is provided at its interior with internal teeth 42 which are in mesh with gears 44 which as shown in FIGURE 2, are three in number. Each of the gears 44 is associated with a second gear 46, the gears 44 and 46 being integrally formed and mounted on serrated mounting pins 48. The smaller planet gears 46 are in mesh with a ring gear 50 which is rotatable within the cylindrical housing 38.

The opposite ends of the serrated pins 48 on which the planet gears 44 and 46 are mounted are supported by a planet carrier 52 and associated bearing plate 54 which is rotatable within the linkage housing.

As a result of the construction so far described, operation of the motor drives the sun gear 32 in rotation. Planet gears 44, being in mesh with the teeth 42 of the ring gear forming a part of the ring gear housing 36, are caused to revolve around the axis of the sun gear 32, imparting rotation to the planet carrier 52 and bearing plate 54 and hence, carrying the smaller planet gears 46 therewith. The planet gears 46 being fixed to the serrated drive pin 48 therefore impart a relatively slow rotation to the rotatable ring gear 50.

Received within the elongated cylindrical tower 40 is a nut and tube assembly comprising a metal sleeve 56 having die cast therein a nut 58 which may be formed of zinc or the like, and which is provided with internal threads for a purpose which will presently appear. The sleeve 56 is apertured as indicated at 60 and the die cast nut of course extends into and fills these diametrically opposed openings.

An elongated multi-start screw 62 is provided in which the threads have a relatively short lead as for example approximately one-half inch so that relative rotation between the screw 62 and the nut 58 effects relatively rapid longitudinal travel. The shaft 62 at its inner end has an extension abutment 63 engageable with the inner end of the sun gear 32. Fixed to the inner end of the screw 62 within the housing member 38 is a friction drive drum 65 having a flanged shell 66 around which is wound a coil spring 68. One end of the spring as shown at 70, extends into a notch 72 provided in the rotating gear 50.

The spring 68 is wound so that in unstressed condition it has an internal diameter substantially smaller than the diameter of the shell 66. Accordingly, the spring when rotated by the rotary ring gear 50 in a direction tending to unwind the spring 68, applies a predetermined torque to the drum 65 and through the drum to the screw shaft 62. On the other hand, when the spring is rotated in the opposite direction tending to wind the spring more tightly on the friction drum 65, no slippage can occur.

While the spring 68 is illustrated in FIGURE 1 as formed of round wire, it will of course be appreciated that it may be formed of square cross-section wire or wire having a flat side to provide a greater frictional area in contact with the shell 66 on the friction drum 65.

Rotation of the screw shaft 62 causes the nut 58 to travel longitudinally in tower 40 in which it is held against rotation by virtue of the pivot connection 22 at its outer end.

Interposed between the friction drum 65 and the end of the housing member 38 is a thrust bearing 75. A thrust bearing 75a is provided in the motor cap 18 engaging the outer end of the motor shaft 28. Accordingly, axially directed thrusts resulting from rotation of the screw shaft 62 are absorbed by thrust bearings 75 or 75a.

As previously stated, the gearing connecting the motor and more specifically the motor shaft 28, to the screw shaft 62 is irreversible. In other words, when the motor is de-energized the transmission including the gearing serves to lock the seat back in whatever position it occupied when the motor was de-energized. However, the transmission includes the frictional drive spring 68 in association with the drum 65 so that forces applied to the seat back 10 tending to move the seat back upwardly or counterclockwise as seen in FIGURE 1, develop forces tending to unwind the spring 68 and accordingly permit the seat back to be raised even though de-energization of the motor has locked the planetary gearing. This is permitted because of the relatively short lead or high helix angle of the threads on the nut 58 and screw shaft 62.

The seat back, a portion of which is indicated at 10, may be provided with resilient means tending to move the seat back forwardly or upwardly from reclining position. Details of such resilient means form no part of the present invention but for completeness such means are diagrammatically illustrated as comprising a coil spring 80 surrounding the pivot connection 14. In this case of course the effectiveness of the spring 80 is selected so that the friction developed by the pring 68 is effective to retain the seat back in adjusted position unless the motor is energized or additional forces are applied manually tending to restore the seat back to its upright position.

The drawing and the foregoing specification constitute a description of the improved power recliner assembly in such full, clear, concise and exact terms as to enable any person skilled in the art to practice the invention, the scope of which is indicated by the appended claims.

What I claim as my invention is:

1. A self-contained power operated extensible link comprising elongated housing structure having an electric motor in one end, said motor having a drive shaft, a tubular guide tower at the opposite end, a screw and nut device comprising a rotatable screw shaft extending from within said housing structure into said tower and fixed against longitudinal movement therein and an internally threaded tube surrounding said screw shaft and having a free end extending outwardly beyond the end of said guide tower, planetary gearing within the housing interconnecting the motor drive shaft and said screw shaft, a friction drum fixed to the end of said screw shaft within said housing structure, and friction means interposed between said planetary gearing and said friction drum.

2. A device as defined in claim 1 in which said friction drive means comprises a coil spring wound on said friction drum and having one end connected to a rotatable member of said planetary gearing, the coil spring being wound in a direction such that forces applied directly to the outer end of said screw shaft in one direction tend to rotate said drum in a direction to wind the coil spring more tightly on the drum and to lock said drum against rotation.

3. A device as defined in claim 1 comprising thrust bearings at opposite ends of said housing structure, said planetary gearing including a sun gear, said motor including a drive shaft fixed to said sun gear and having one end engaged with one of said thrust bearings, said screw shaft having an abutment in engagement with the end of said said sun gear remote from the motor drive shaft, said other thrust bearing being interposed between the friction drum fixed to said screw shaft and the adjacent end of said housing structure.

4. Reclining seat structure comprising a seat frame, a seat back pivoted to said seat frame, and a self-contained power operated extensible link interposed between said seat frame and said seat back, said link including housing structure having an electric motor and planetary gearing therein, an elongated rotary screw shaft connected to said motor and fixed against axial displacement within said housing structure, a nut connected to the outer end of said screw shaft, means preventing rotation of said nut whereby upon operation of said motor, said shaft is rotated and said nut is moved longitudinally of said housing structure, said housing structure including a tubular guide extension, said nut comprising an internally threaded tubular device engaging said screw shaft and having an outer end portion extending outwardly beyond the open end of said tubular guide extension, and a friction drive connection interposed between the said planetary gearing and said screw shaft and effective to permit slippage so as to provide for upward movement of the seat back to erect position while said motor is de-energized and retains said planetary gearing in locked position.

5. Reclining seat structure as defined in claim 4 in which the threads on said screw shaft have a short lead so as to prevent a friction lock against rotation of said shaft by forces applied axially to said nut.

References Cited

UNITED STATES PATENTS

| 2,307,317 | 1/1943 | König | 74—424.8 |
| 2,648,229 | 11/1953 | Lura | 74—378 |
| 2,649,300 | 11/1953 | Launder. | |
| 3,022,681 | 2/1962 | Cook | 74—665 |
| 3,269,199 | 8/1966 | Deehan et al. | 74—89.15 |

LEONARD H. GERIN, Primary Examiner